United States Patent
Yavo et al.

(10) Patent No.: US 12,363,135 B2
(45) Date of Patent: Jul. 15, 2025

(54) ENABLING ENHANCED NETWORK SECURITY OPERATION BY LEVERAGING CONTEXT FROM MULTIPLE SECURITY AGENTS

(71) Applicant: Fortinet, Inc., Sunnyvale, CA (US)

(72) Inventors: Udi Yavo, Herzlia (IL); Roy Katmor, San Francisco, CA (US); Ido Kelson, Tel-Aviv (IL)

(73) Assignee: Fortinet, Inc., Sunnyvale, CA (US)

( * ) Notice: Subject to any disclaimer, the term of this patent is extended or adjusted under 35 U.S.C. 154(b) by 366 days.

(21) Appl. No.: 17/105,588

(22) Filed: Nov. 26, 2020

(65) Prior Publication Data

US 2022/0166783 A1    May 26, 2022

(51) Int. Cl.
*H04L 9/00* (2022.01)
*H04L 9/40* (2022.01)
*H04L 41/22* (2022.01)

(52) U.S. Cl.
CPC .......... *H04L 63/1416* (2013.01); *H04L 41/22* (2013.01); *H04L 63/1425* (2013.01); *H04L 63/145* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 11,005,860 B1 * | 5/2021 | Glyer | H04L 41/064 |
| 2017/0078114 A1 * | 3/2017 | Mibu | H04L 41/122 |
| 2018/0091528 A1 * | 3/2018 | Shahbaz | G06F 21/53 |
| 2018/0359272 A1 * | 12/2018 | Mizrachi | H04L 67/535 |
| 2020/0311263 A1 * | 10/2020 | Riviere | G06F 11/3013 |

* cited by examiner

*Primary Examiner* — Syed M Ahsan
(74) *Attorney, Agent, or Firm* — Jaffery Watson Hamilton & DeSanctis LLP

(57) ABSTRACT

Systems and methods are described for synergistically combining network security technologies to improve automated response to security incidents. An endpoint security agent running on the endpoint device detects an incident, generates a security incident alert by proactively collecting data regarding the incident, and causes a network access control (NAC) agent to execute an automated network operation based on the security incident alert. In an embodiment, a security device is operable to use EDR data and NAC data in combination to improve asset discovery. The security device may use the EDR data and the NAC data in combination for performing deep vulnerability assessment and taking remedial actions.

24 Claims, 11 Drawing Sheets

ENABLING ENHANCED NETWORK SECURITY OPERATION BY LEVERAGING CONTEXT FROM MULTIPLE SECURITY AGENTS

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2020, Fortinet, Inc.

FIELD

Embodiments of the present disclosure generally relate to the field of network security. In particular, embodiments of the present disclosure relate to synergistic cooperation/communication among multiple network security agents to achieve enhanced network security operations.

BACKGROUND

Description of the Related Art

Existing network security technologies, such as, Network Access Control (NAC), endpoint detection and response (EDR), event management, and analytics tools, work well in their respective individual capacities and each has their own set of capabilities, with some overlap. NAC provides the network visibility to see everything connected to the network, as well as the ability to control those devices and users, including dynamic, automated responses. EDR facilitates the detection of attacks on endpoints and orchestration of appropriate responses. Event management systems (e.g., security information and event management (SIEM) security products) are capable of receiving alerts and/or generating alerts based on data collected collects from various security controls. Analytics tools (e.g., user entity behavior analytics (UEBA)) assist in connection with protecting enterprises from insider threats by monitoring users and endpoints and identifying potential anomalous behavior. At present, however, these network security technologies operate in silos and do not share information with each other that might be mutually beneficial.

SUMMARY

Systems and methods are described for synergistically combining network security technologies to improve asset discovery and automated response to security incidents. According to one embodiment, an endpoint device includes a processing resource and a non-transitory computer-readable medium, coupled to the processing resource, having stored therein instructions that, when executed by the processing resource, cause the processing resource to perform asset discovery and enhanced automated network operations. In an embodiment, the endpoint device may be configured with different endpoint security agents, for example, an endpoint detection and response (EDR) agent, a network access control (NAC) agent, a security information and information management (STEM) agent, and a user and entity behavior analysis agent (UEBA) agent to work in sync. The endpoint device may use synergistically collected data for asset discovery and facilitating enhanced automated network operations.

In an embodiment, an endpoint security agent running on the endpoint device detects an incident, generates a security incident alert by proactively collecting data regarding the incident, and cause a network access control (NAC) agent to execute an automated network operation based on the security incident alert. The automated network operation includes isolating the endpoint device from other assets associated with the private network, rerouting the traffic of the endpoint device, moving the endpoint device to different VLAN, moving the endpoint device to a different subnet, and moving the endpoint device to a different network.

The endpoint security agent transmits the security incident alert to the NAC agent corresponding to a NAC service of a Managed Security Service Provider (MSSP) protecting a private network with which the endpoint device is associated, to execute an automated network operation based on the security incident alert. The NAC agent executes the automated network operation based on the security incident alert by requesting direction from the NAC service. The NAC agent may execute the automated network operation based on the security incident alert by consulting NAC policies locally stored on the endpoint device. In an embodiment, the endpoint security agent includes an EDR agent associated with an EDR service of the MSSP. The EDR agent detects an incident, generates the incident by actively collecting data regarding the incident, and cause the NAC agent to execute an automated network operation. In an embodiment, the endpoint security agent includes an event management agent associated with an event management service of the MSSP. The event management agent may be a security information and event management (STEM) agent associated with a STEM service of the MSSP. The event management agent includes a UEBA agent associated with a UEBA service of the MSSP.

In an embodiment, an endpoint device collects using an EDR agent associated with an EDR service protecting a private network with which the endpoint device is associated, information regarding a state (e.g., information regarding drivers installed) or a type (e.g., IoT device) of an asset coupled to the endpoint device by performing asset discovery regarding the asset, supplement asset information collected by a NAC service regarding the asset by reporting the collected information to the NAC service via a NAC agent of the plurality of endpoint security agents corresponding to the NAC service. The asset discovery includes scanning the asset and/or passively listing to communication received from the asset.

In an embodiment, the EDR agent, responsive to alert reporting, may receive direction from the NAC service via the NAC agent to cause the asset to perform a remediation action. The EDR agent, responsive to alert reporting, may receive direction from the NAC service via the NAC agent to perform vulnerability assessment scanning on the asset.

Other features of embodiments of the present disclosure will be apparent from accompanying drawings and detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
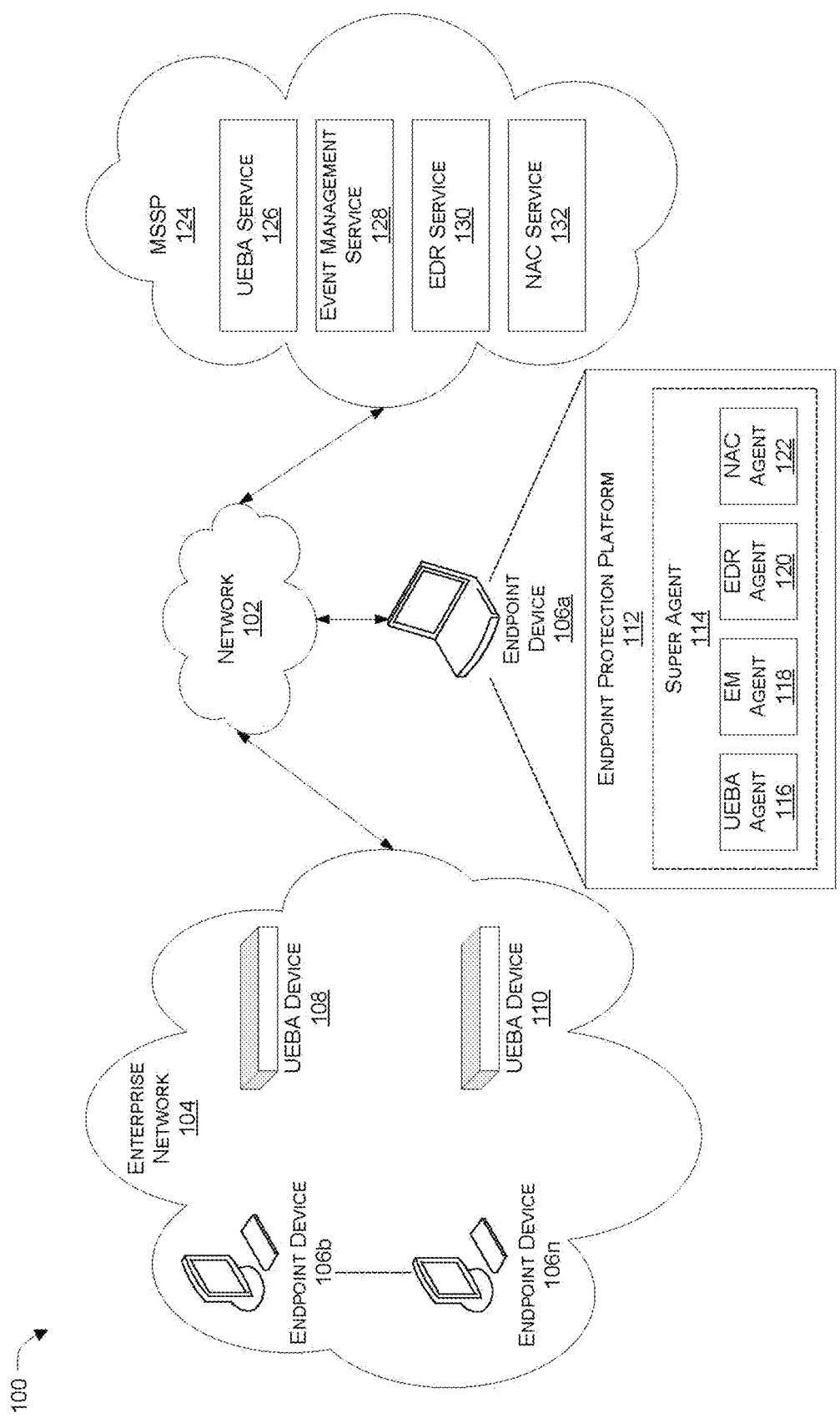
FIGS. 1A-B illustrate exemplary network architectures in accordance with an embodiment of the present disclosure.

Systems and methods are described for synergistically combining network security technologies to perform asset discovery and to improve automated response to a security incident. In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a processing resource (e.g., a general-purpose or special-purpose processor) programmed with the instructions to perform the steps. Alternatively, steps may be performed by a combination of hardware, software, firmware, and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

Terminology

Brief definitions of terms used throughout this application are given below.

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

The phrase "data feed" generally refers to a security event classification source or a threat intelligence sources. Non-limiting examples of data feeds include various types of endpoint protection platforms, antivirus engines, static malware analysis engines, dynamic malware analysis engines, memory forensic engines, sandboxes, User and Entity Behavior Analytics (UEBA), Intrusion Detection Systems (IDSs), content inspection engines, distributed denial of service (DDoS) mitigation engines, machine-learning malware classifiers, file threat-feeds, Internet Protocol (IP)/ uniform resource locator (URL) threat feeds, Indicators of compromise (IOC) threat feeds, file reputation services, IP/URL reputation services, vulnerability discovery services, Tactics Techniques and Procedures (TTPs) feeds, security events collected from another private network, EDR data, network security devices and the like.

The phrase "endpoint protection platform" generally refers to cybersecurity monitoring and/or protection functionality implemented on an endpoint device. In one embodiment, the endpoint protection platform can be deployed in the cloud or on-premises and supports multi-tenancy. The endpoint protection platform may include a kernel-level Next Generation AntiVirus (NGAV) engine with machine learning features that prevent infection from known and unknown threats and leverage code-tracing technology to detect advanced threats such as in-memory malware. The endpoint protection platform may be deployed on the endpoint device in the form of a lightweight endpoint agent that utilizes less than one percent of CPU and less than 100 MB of RAM and may leverage, among other things, various security event classification sources provided within an associated cloud-based security service. Non-limiting examples of an endpoint protection platform include the FORTIEDR Software as a Service (SaaS) platform and the FORTICLIENT integrated endpoint protection platform available from Fortinet, Inc. of Sunnyvale, CA.

As used herein an "incident" generally refers to any malicious act or suspicious event observed within a private network. Such malicious acts typically (i) compromise or represent an attempt to compromise the logical border surrounding a network to which assets (e.g., programmable electronic devices and communication networks including hardware, software, and data) are connected and for which access is controlled or (ii) disrupt or represent an attempt to disrupt such assets. Non-limiting examples of types or classes of incidents include unauthorized attempts to access systems or data, privilege escalation attacks, unusual behavior from privileged user accounts, insider threats (e.g., insiders trying to access servers and data that isn't related to their jobs, logging in at abnormal times from unusual locations, or logging in from multiple locations in a short time frame), anomalies in outbound network traffic (e.g., uploading large files to personal cloud applications, downloading large files to external storage devices, or sending large numbers of email messages with attachments outside the company), traffic sent to or received from unknown locations, excessive consumption of resources (e.g., processing, memory and/or storage resources), changes in configuration (e.g., reconfiguration of services, installation of startup programs, the addition of scheduled tasks, changes to security rules or firewall changes), hidden files (may be considered suspicious due to their file names, sizes or locations and may be indicative that data or logs may have been leaked), unexpected changes (e.g., user account lockouts, password changes, or sudden changes in group memberships), abnormal browsing behavior (e.g., unexpected redirects, changes in browser configuration, or repeated pop-ups), suspicious registry entries, phishing attacks, malware attacks, denial-of-service (DoS) attacks, man-in-the-middle attacks, and password attacks.

In the context of an endpoint device, the term "event" generally refers to an action or behavior of a process running on the endpoint device. Non-limiting examples of events include filesystem events and operating system events. Events that may be initially classified as suspicious or malicious by a heuristic engine and/or a machine-learning engine employed by the endpoint protection platform, for example, may include an attempt to communication with a critical software vulnerability (CVE), an attempt to access the registry of the operating system, the network or the file system, an attempt by the process to copy itself into another process or program (in other words, a classic computer virus), an attempt to write directly to the disk of the endpoint device, an attempt remain resident in memory after the process has finished executing, an attempt to decrypt itself when run (a method often used by malware to avoid signature scanners), an attempt to binds to a TCP/IP port and listen for instructions over a network connection (this is pretty much what a bot—also sometimes called drones or zombies—do), an attempt to manipulate (copy, delete, modify, rename, replace and so forth) files that are associated with the operating system, an attempt to read the memory of sensitive programs, an attempt to hook keyboard or mouse (a/k/a keylogging), an attempt capture a screen shot, an attempt to record sounds, and/or other behaviors or actions that may be similar to processes or programs known to be malicious. In one embodiment, events may be detected or intercepted by the endpoint protection platform hooking filesystem and/or operating system application programming interface (API) calls of interest and/or by leveraging a hypervisor to monitor the operating system.

As used herein "indicators of compromise" or simply "indicators" generally refer to pieces of forensic data that identify potentially malicious activity on a system or network. Non-limiting examples of such data include data found in system log entries or files. Indicators of compromise may aid information security and IT professionals in detecting data breaches, malware infections, or other threat activity. By monitoring for indicators of compromise, organizations can detect attacks and act quickly to prevent breaches from occurring or limit damages by stopping attacks in earlier stages. Non-limiting examples of indicators of compromise include unusual outbound network traffic, anomalies in privileged user account activity, geographical irregularities, log-in red flags, increases in database read volume, Hypertext Markup Language (HTML) response sizes, large numbers of requests for the same file, mismatched port-application traffic, suspicious registry or system file changes, unusual DNS requests, unexpected patching of systems, mobile device profile changes, bundles of data in the wrong place, web traffic with unhuman behavior, and signs of distributed DoS (DDoS) activity.

As used herein, a "network security appliance" or a "network security device" generally refers to a device or appliance in virtual or physical form that is operable to perform one or more security functions. A network security device may reside within the particular network that it is protecting or network security may be provided as a service with the network security device residing in the cloud. Some network security devices may be implemented as general-purpose computers or servers with appropriate software operable to perform the one or more security functions. Other network security devices may also include custom hardware (e.g., one or more custom Application Specific Integrated Circuits (ASICs)). For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

As used herein, a "super agent" generally refers to a set of cooperating security agents running on an endpoint device that are associated with respective security services. The agents may be operable to one or more of (i) communicate with their respective security services, (ii) locally apply policies configured by their respective security services, (iii) take action on network traffic, and (iv) collect and/or supply data regarding incidents, events and/or indicators. Non-limiting examples of agents that may be part of a super agent include a UEBA agent, an EM agent, an EDR agent, a network access control (NAC) agent, and a unified threat management (UTM) agent. According to various embodiments, the agents of the super agent may work synergistically with one or more of the other agents of the super agent and/or one or more other elements/components (e.g., security services and/or security functions provided by network security appliances) of a security fabric into which the elements/components are integrated, thereby enhancing network visibility and threat detection and providing a means for synchronizing a coordinated response. Non-limiting integration mechanisms by which the various agents and elements/components may communicate include Syslog messages and Representational State Transfer (REST) APIs.

For example, based on configured settings, the EDR agent may be operable to send information regarding EDR security events to a configured destination server in the form of syslog messages. Alternatively, agents may be able to request information from, send information to, and/or request action to be taken by another agent or element/component via a rich set of APIs. In one embodiment, as more components/agents are installed as part of a super agent more capabilities may be unlocked. For example, some capabilities are only available when a number of agents/components are installed. Depending upon the particular implementation, the super agent may use a unified installer that can install any combination of the agents and configure them. The different agents/components are aware of another and can communicate with one another, for example, via an inter-process communication mechanism (e.g., pipes)

FIG. 1A illustrates exemplary network architecture 100 in accordance with an embodiment of the present disclosure. In the context of network architecture 100, a super agent 114 is present within an endpoint protection platform 112 of an endpoint device 106-a, which is connected to an enterprise network 104 via a network 102. Super agent 114 includes a user and entity behavior analytics (UEBA) agent 116, an events management (EM) agent 118, an endpoint detection and response (EDR) agent 120, and a network access control (NAC) agent 122. UEBA agent 116, EM agent 118, EDR agent 120, and NAC agent 122 may be communicatively coupled with corresponding security services that are implemented on-premises (e.g., in the enterprise network 104) and/or in the cloud using a cloud-based security platform (e.g., managed security service provider (MSSP) 124). Each of the agents is aware of one another and may communicate with one another, for example, via an inter-process communication mechanism (e.g., a Linux or Unix pipe) supported by the operating system. In this manner, the various security services may make use of information available via one or more of the other security services by interacting via their respective agents.

In the context of the present example, enterprise network 104 includes endpoint devices 106 and 106n and a number of network security devices (e.g., a UEBA device 108 and an event management device 110) for protecting the enterprise network 104 and endpoint devices 106a-n. Endpoint devices 106a-n associated with the enterprise network 104 may be coupled in communication via network 102 with MSSP 124. The endpoint devices 106a-n (which may be collectively referred to herein as endpoint devices 106, and which may be individually referred to herein as endpoint device 106) associated with network 102 may include but are not limited to personal computers, smart devices, web-enabled devices, hand-held devices, laptops, mobile devices, IoT devices, and the like. Those skilled in the art will appreciate network 102 may be a wireless network, a wired network, or a combination thereof and may be implemented as one of the various types of networks, such as an Intranet, a Local Area Network (LAN), a Wide Area Network (WAN), an Internet, and the like. Further, network 102 may either be a dedicated network or a shared network. A shared network may represent an association of the different types of networks that use a variety of protocols, for example, Hypertext Transfer Protocol (HTTP), Transmission Control Protocol/Internet Protocol (TCP/IP), Wireless Application Protocol (WAP), and the like.

In an embodiment, super agent 114 is operable within the endpoint protection platform 112 of endpoint device 106a of the enterprise network 104. Super agent 114 includes multiple cooperating network security agents. The network security agents include a UEBA agent 116, an EM agent 118, an EDR agent 120, and a NAC agent 122. As noted above, a security service corresponding to each of the multiple network security agents may be implemented on-premises and/or within a cloud-based security platform (e.g., MSSP 124) to which the enterprise subscribes. While not specifically illustrated in the context of the present example, those skilled in the art will appreciate the endpoint protection platform 112, and associated super agent 114 may also be running on each of endpoint devices 106*b-n*.

While in the context of the present example, some security services are shown implemented both on-premises and in the cloud (e.g., by MSSP 124), those skilled in the art will appreciate such security services need not be duplicated, but rather, depending upon the particular implementation may be implemented on-premises by physical or virtual network security devices deployed within the enterprise network 104 and other security services may be implemented in the cloud, for example, by MSSP 124. For example, in one embodiment, a UEBA service and a STEM service may be implemented on-premises by UEBA device 108 and event management device 110, respectively, while the EDR service 130 is implemented in the cloud. Those skilled in the art will appreciate depending upon the particular implementation, some subset of security services corresponding to the agents 116, 118, 120, and 122 implemented within the endpoint protection platform 112 may be implemented on-premises (e.g., by physical or virtual network security devices deployed within the enterprise network 104) or in the cloud, for example, by MSSP 124. As such, in the context of the present example, MSSP 124 is shown including a UEBA service 126, an event management service 128, an EDR service 130, and a NAC service 132, that may be used instead of or in addition to security services implemented on-premises for providing protection against threats and attacks on the enterprise network 104 and the endpoint devices 106*a-n* and detection of the compromised device(s).

Various non-limiting example scenarios in which the agents 116, 118, 120, and 122 may communicate with each other to synergistically combine information available via a variety of security services (e.g., UEBA device 108, event management device 110, UEBA service 126, event management service 128, EDR service 130, and NAC service 132) to facilitate detection of compromised devices are described below with reference to FIGS. 4-9.

Figure 1B:
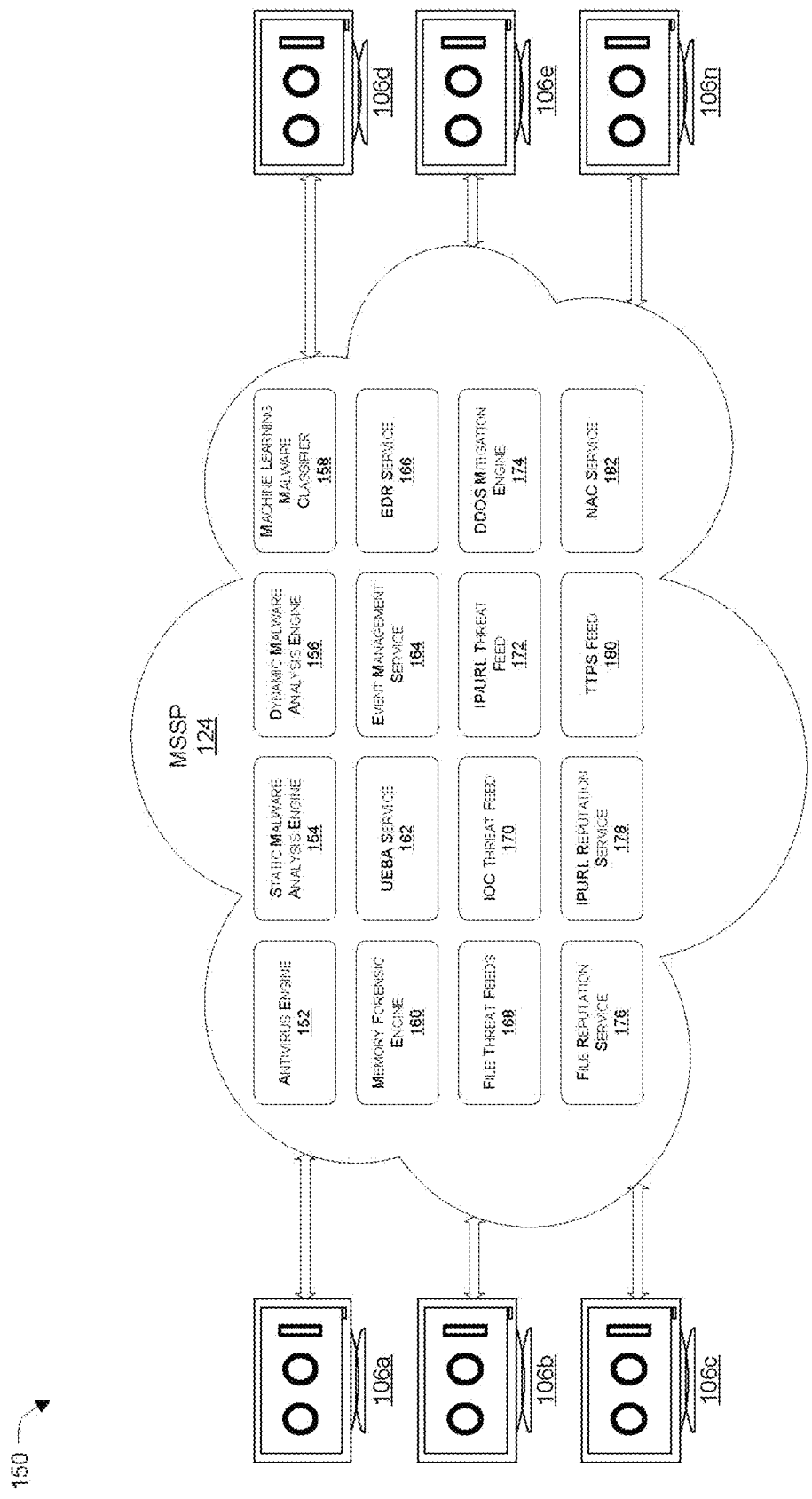

FIG. 1B illustrates a cloud-based network architecture 150 in which various aspects may be implemented in accordance with an embodiment of the present disclosure. In the context of the present example, a cloud-based security service/platform (e.g., MSSP 124) implements multiple data feeds 152-180 that are capable of independently detecting compromised device (e.g., IoT device, end-user device, etc.), for example, by detecting malicious activity and collecting relevant evidence, and identifying compromised device. The cloud-based security service can be used for collecting information related to an incident detected by the agent (e.g., EDR agent 120) running on the endpoint device, generate an alert, and perform automated network operation based on the alert. The cloud-based security service can be used for collecting EDR data via an EDR agent running on an endpoint device, and collecting NAC data via NAC agent to supplement the EDR data in order to perform asset discovery, perform automated network operation, generate remedial action, and perform a vulnerability assessment.

In an embodiment, an endpoint device configured with multiple endpoint security agents (e.g., EDR agent, NAC agent, EM agent, UEBA, etc.) may detect an incident, generate an incident report by collecting data from two or more agents and perform automated network operation. The endpoint device may collect EDR data via the EDR agent, collect NAC data via the NAC agent, and perform detailed device discovery by combing the EDR data and the NAC data. The EDR data is supplemented with NAC data to perform asset discovery.

Non-limiting examples of data feed that may be used depending upon the particular implementation include various types of endpoint protection platforms (e.g., running on endpoint devices 106), an antivirus engine 152, a static malware analysis engine 154, a dynamic malware analysis engine 156 (e.g., a sandbox), machine-learning malware classifiers 158, a memory forensic engine 160, User and Entity Behavior Analytics (UEBA) service 162, an Event Management (EM) service 164, endpoint detection and response (EDR) service 166, file threat-feeds 168, an IoC threat feeds 170, an IP/URL threat feed 172, a distributed denial of service (DDoS) mitigation engine 174, a file reputation service 176, an IP/URL reputation service 178, a TTP feed 180, a NAC service 182, third party network services and the like. A cloud-based security platform may include a UEBA service 162, an event management service 164, an EDR service 166, and a NAC service 182.

UEBA agents (e.g., UEBA agent 116) running on endpoint devices 106, for example, as part of an endpoint protection platform (e.g., an endpoint protection platform 112) may make use of UEBA service 162 in connection with protecting the enterprise network (e.g., enterprise network 104) and the endpoint device 106 from insider threats by continuously monitoring users and endpoints with automated detection and response capabilities. According to one embodiment, the UEBA agent may make use of machine learning and advanced data analytics to automatically identify non-compliant, suspicious, or anomalous end-user behavior and may alert appropriate personnel (e.g., a network administrator or the user of the endpoint device at issue) regarding the potential of a compromised user account. This proactive approach to threat detection may deliver an additional layer of protection and visibility, whether the users are on or off the corporate network.

EM agents (e.g., EM agent 118) running on endpoint devices 106, for example, as part of an endpoint protection platform (e.g., an endpoint protection platform 112) may make use of event management service 164 to manage more complex endpoints, IoT, infrastructure, security tools, applications, VMs and the like, which may be constantly secured and monitored. The event management service 164, such as a STEM service, may facilitate the management of devices by providing visibility, correlation, automated response, and remediation in a single, scalable solution. By using a business services view, the complexity of managing network and security operations may be reduced, by freeing resources and improving breach detection.

EDR agents (e.g., EDR agent 120) running on an endpoint device 106, for example, as part of an endpoint protection platform (e.g., an endpoint protection platform 112) may make use of EDR service 166 to deliver advanced, real-time threat protection for endpoints both for pre-infection and post-infection scenarios. EDR agents may proactively reduce an attack surface, prevent malware infections, detect and defuse potential threats in real-time, and may automate response and remediation procedures with customizable playbooks. EDR technology may help enterprises to stop breaches in real-time automatically and efficiently, without overwhelming security teams with a slew of false alarms or disrupting business operations.

NAC agents (e.g., NAC agent 122) running on an endpoint device 1026, for example, as part of an endpoint protection platform (e.g., an endpoint protection platform 112) may make use of NAC service 182 to improve the visibility of network devices attached to the network and monitor network activities by attached devices. The NAC agent 122 and the NAC service in collaboration may provide the network visibility to see everything connected to the network, as well as the ability to control those devices and users, including dynamic, automated responses.

Figure 2:
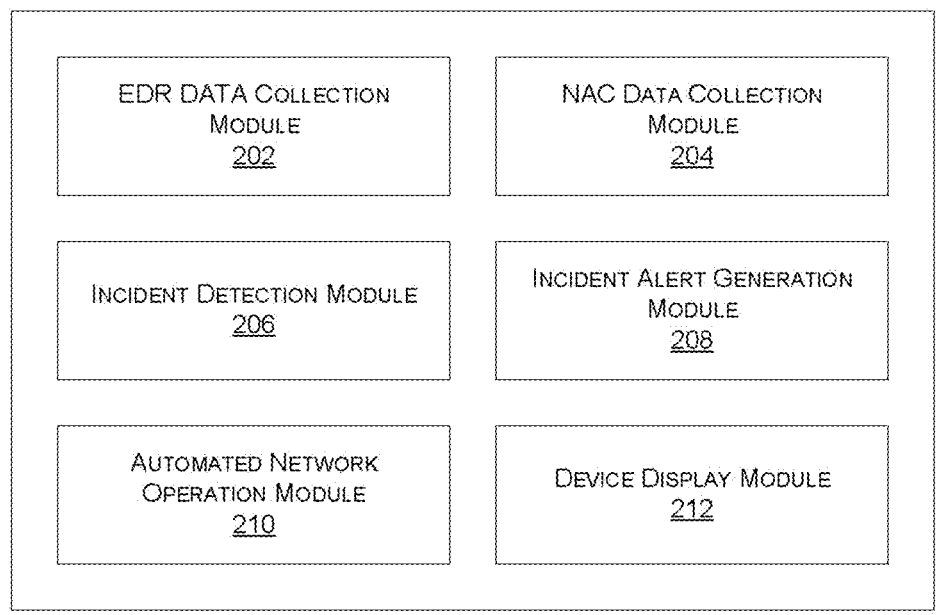
FIG. 2 is a block diagram illustrating functional modules of an automated security response system in accordance with an embodiment of the present disclosure.

FIG. 2 is a block diagram illustrating functional modules of an automated security response system 200 in accordance with an embodiment of the present disclosure. System 200 includes multiple endpoint security agents running on an endpoint device and corresponding cloud-based security services running in the cloud environment operable to work in collaboration for performing asset discovery, vulnerability assessment, taking remedial action, and performing various automated operations. The endpoint security agents may include, for example, an EDR agent (e.g., EDR agent 120), a network access control (NAC) agent (e.g., NAC agent 122), security information and information management (SIEM) agent (e.g., EM agent 118), and a user and entity behavior analysis agent (UEBA) agent (e.g., UEBA agent 116), configured to work cooperatively to collect device data, asset data, and network data. The system 200 may use collected data to achieve synergies in connection with asset discovery, performing vulnerability assessment, facilitating enhanced automated network operations, and/or performing remedial actions.

In an embodiment, the system 200 includes an EDR data collection module 202 configured to cause one or more EDR agents (e.g., EDR agent 120) of multiple endpoint security agents running on respective endpoint devices (e.g., endpoint devices 106a-n) to collect EDR data, a NAC data collection module 204 configured to cause one or more NAC agents (e.g., NAC agent 122) of the multiple endpoint security agents running on respective endpoint devices to collect NAC data, an incident detection module 206 configured to cause an endpoint security agent of the multiple agents running on the endpoint device to detect an incident on the endpoint device, and a security incident alert generation module 208 configured to cause the endpoint security agent to collect in collaboration with other endpoint security agents, different types of data related to the incident and the endpoint device and generate a security incident alert. The incident alert may include enhanced data collected by multiple endpoint security agents.

The system 200 includes an automated network operation module 210 configured to execute an automated network operation based on the security incident alert. The automated network operation module 210 may utilize a NAC agent and an associated NAC service to cause enhanced automated operations to be applied to assets based on the EDR data, STEM data, and UEBA data. In an embodiment, the module 210 may use NAC functionality (e.g., the NAC agent working in collaboration with the NAC service) as a means to execute automated network operations based on alerts and/or supplemental data collected from the other endpoint security agents (e.g., the EDR agent, the STEM agent, and/or the UEBA agent). For example, if a malicious file is detected by the EDR agent of an endpoint device, NAC functionality may automatically isolate the endpoint from a corporate network or move the endpoint device to a dedicated network segment. The NAC functionality may automatically quarantine the endpoint device and attached asset (s), if any, in response to receiving the incident alert. The automated network operation may include isolating the endpoint device from other assets associated with the private network, rerouting the traffic of the endpoint device, moving the endpoint device to a different VLAN, moving the endpoint device to a different subnet, and moving the endpoint device to a different network. In an embodiment, the endpoint security agent transmits the security incident alert to the NAC agent corresponding to a NAC service of a Managed Security Service Provider (MSSP) protecting a private network with which the endpoint device is associated, to execute an automated network operation based on the security incident alert. Depending upon the particular implementation, the NAC agent may execute the automated network operation based on the security incident alert by requesting direction from the NAC service. Alternatively or additionally, the NAC agent may execute the automated network operation based on the security incident alert by consulting NAC policies stored locally on the endpoint device. In an embodiment, the endpoint security agent includes an EDR agent associated with an EDR service of the MSSP.

In an embodiment, the EDR agent generates the incident alert by actively collecting data regarding the incident and causes the NAC agent to execute an automated network operation. The endpoint security agent includes an event management (EM) agent (e.g., EM agent 118) associated with an event management service (e.g., event management service 128) of the MSSP. The event management agent may be a security information and event management (STEM) agent associated with a STEM service of the MSSP. The event management agent includes a UEBA agent associated with a UEBA service of the MSSP.

The system 200 further includes a device discovery module 212 configured to collect using the EDR agent associated with an EDR service protecting a private network with which the endpoint device is associated, information regarding a state (e.g., information regarding drivers installed) or a type (e.g., IoT device) of the endpoint device and one or more assets coupled to the endpoint device, supplements asset information collected by a NAC service regarding the asset for performing asset discovery. The module 212 may use the EDR data and the NAC data in combination for performing asset discovery.

In an embodiment, module 212 collects the EDR data through an EDR agent associated with an EDR service (e.g., EDR service 130) of a Managed Security Service Provider (MSSP) protecting a private network with which the endpoint device is associated. The EDR data may include information regarding a state or a type of an asset coupled to the endpoint device by performing asset discovery regarding the asset. Module 212 may use the NAC data as a supplement for more accurate asset discovery and understanding the nature of the asset. The module 212 may use asset information collected by a network access control (NAC) service (e.g., NAC service 132) of the MSSP regarding the asset via a NAC agent. The asset discovery may include active scanning of the asset and/or passively listing to communication received from the asset at the endpoint device.

As one may appreciate, the EDR functionality (e.g., the EDR agent working in collaboration with EDR service) is endpoint central security feature and thus can discover what the endpoints see using scanning, passive listening, and other techniques. The EDR functionality may have additional context and/or information that the NAC functionality does not have. For example, information regarding phones that are connected to a machine, exact IoT versions due to installed drivers, and more may be more easily available to the EDR functionality. On the other hand, the NAC functionality leverages the network traffic itself and thus can see communications that are otherwise not typically visible to the EDR functionality and thus can see assets the endpoint cannot see. Module 212 may use such supplemental data (e.g., EDR data in combination with NAC data) to perform asset discovery.

In an embodiment, the EDR agent, responsive to alert reporting, may receive direction from the NAC service via the NAC agent to cause the asset to perform a remediation action. The EDR agent, responsive to alert reporting, may alternatively or additionally receive direction from the NAC service via the NAC agent to perform vulnerability assessment scanning on the asset.

Figure 3:
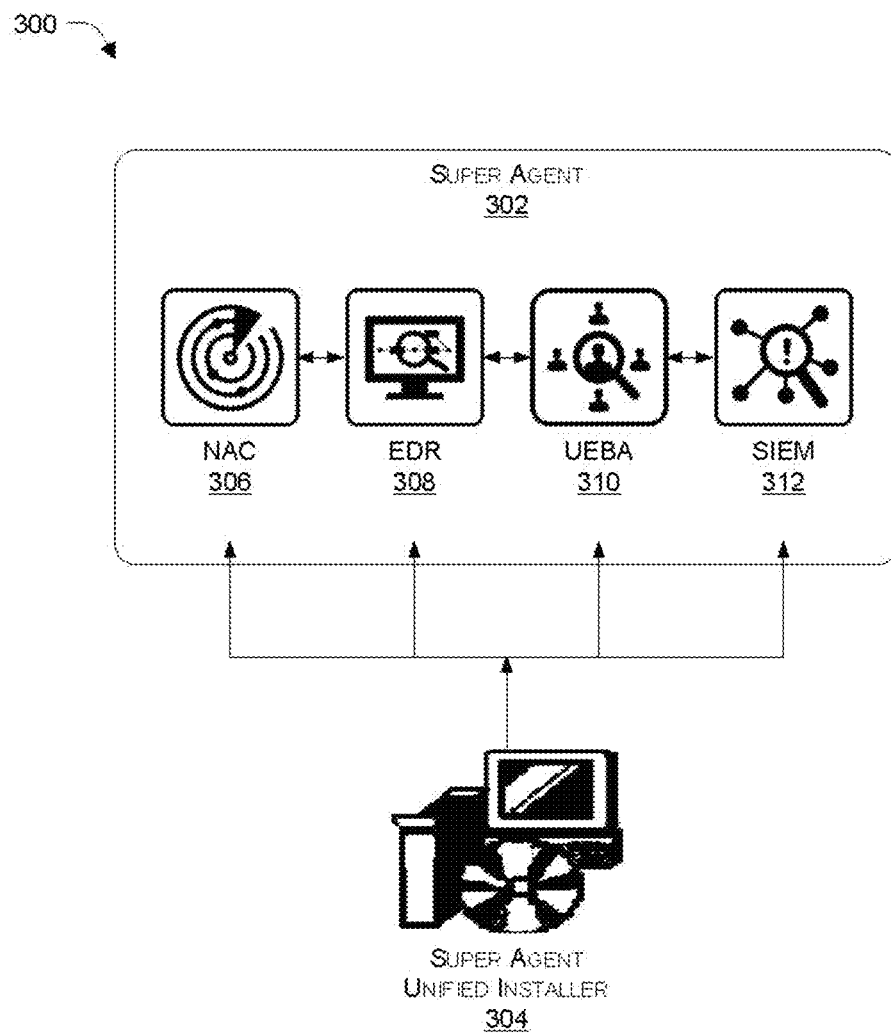
FIG. 3 is a block diagram illustrating multiple endpoint security agents in accordance with an embodiment of the present disclosure.

FIG. 3 is a block diagram 300 illustrating multiple endpoint security agents in accordance with an embodiment of the present disclosure. A super agent 302 including multiple cooperating agents, for example, NAC 306, EDR 308, UEBA 310, and SIEM 312, may be installed on an endpoint device using a super agent unified installer 304. The installer 304 may allow a user to select one or a combination of security agents to be installed on the endpoint device. The security agents running on the endpoint device may be aware of the presence of other security agents running on the endpoint device and their respective capabilities. The security agents may communicate with each other to aggressively collect more data related to a suspected incident or a detected incident.

Figure 4:
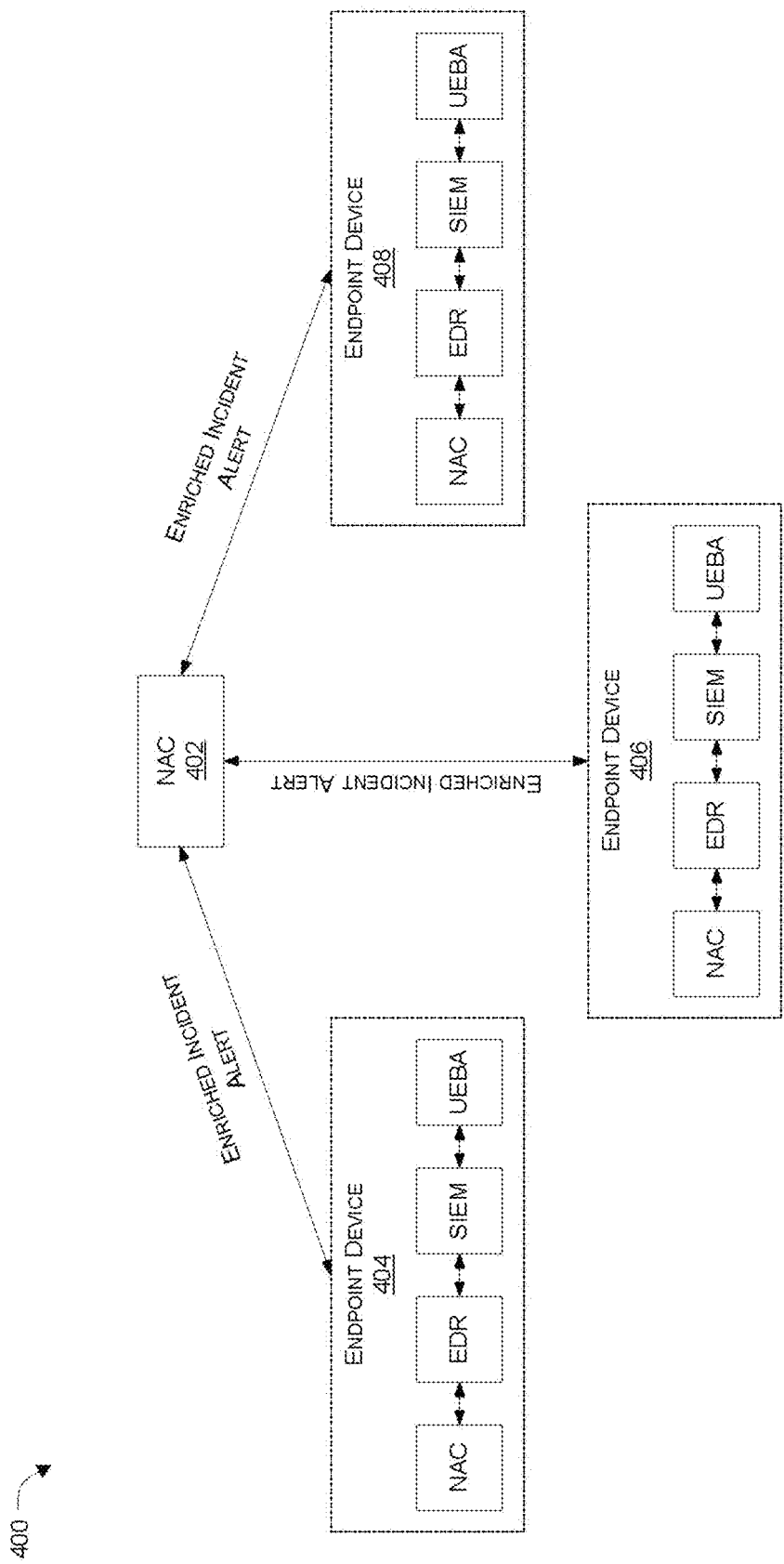
FIG. 4 is a block diagram illustrating interactions between a network access control service and incident detection and response service in accordance in accordance with an embodiment of the present disclosure.

FIG. 4 is a block diagram 400 illustrating interactions between a network access control service and incident detection and response service in accordance in accordance with an embodiment of the present disclosure. As shown in FIG. 4, each endpoint device, for example, endpoint device 404, endpoint device 406, and endpoint device 408, may have multiple endpoint security agents installed on it. Any of the endpoint security agents of the multiple endpoint security agents installed on a particular endpoint device, on detection of an incident, may work with other endpoint security agents to aggressively collect data related to the incident and share an enhanced incident alert to a NAC 402 service (e.g., NAC service 132). The NAC service 402, on receiving the incident report, may collect NAC data from the endpoint device by which the incident was reported, explore EDR data received with the incident report, and perform automated security operations. The NAC 402 may also use the combination of the EDR data and the NAC data for performing asset discovery.

Figure 5:
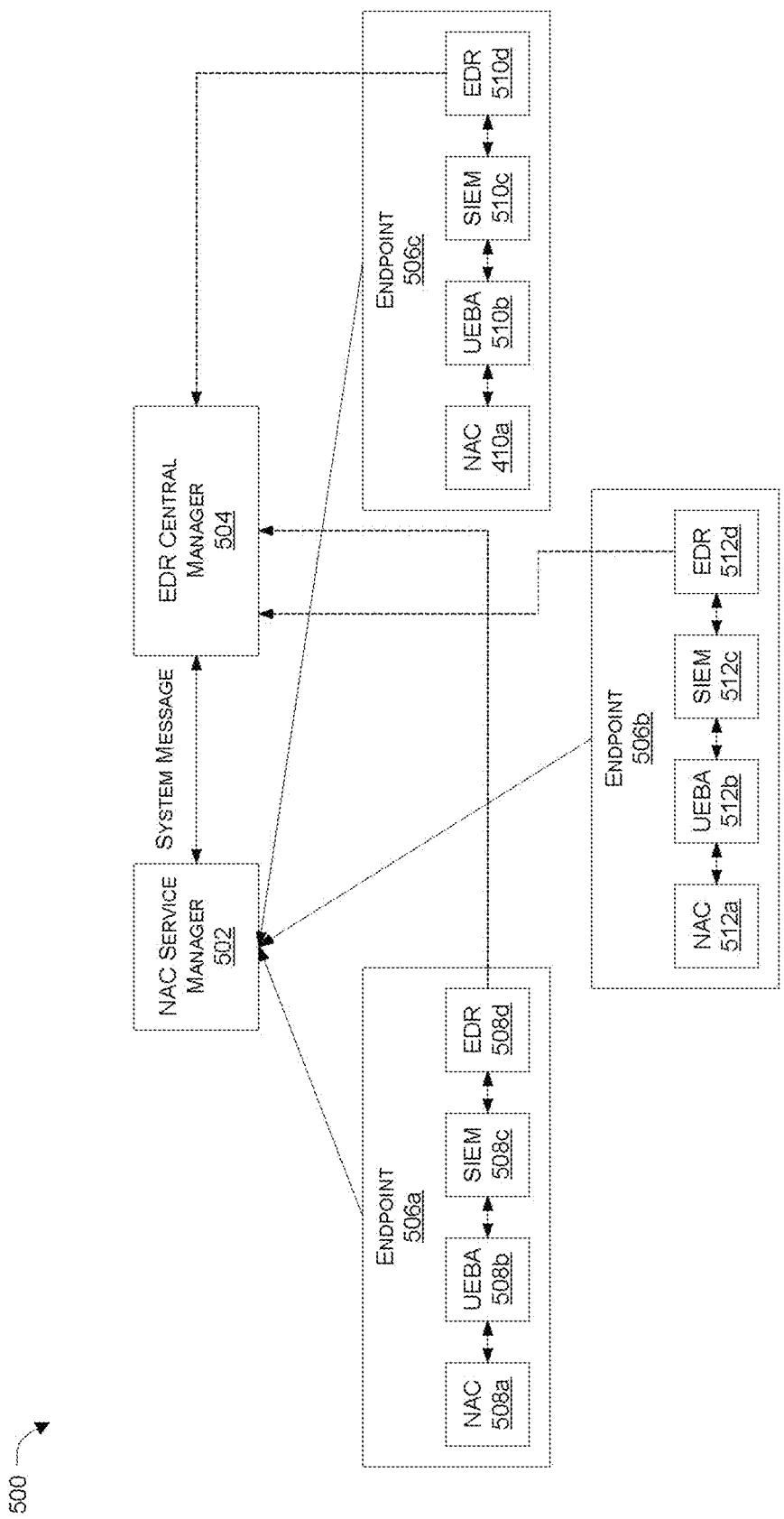
FIG. 5 is a use-case diagram illustrating interactions between NAC, SIEM, EDR, and UEBA agents that are configured as part of a super-agent in accordance with an embodiment of the present disclosure.

FIG. 5 is a use-case diagram 500 illustrating interactions between NAC, SIEM, EDR, and UEBA agents that are configured as part of a super-agent in accordance with an embodiment of the present disclosure. In an embodiment, an EDR central manager 504 may collect EDR data via EDR agents (e.g., EDR 508*d*, EDR 510*d*, EDR 512*d*, etc.) installed on different endpoint devices (e.g., endpoint 506*a*, endpoint 506*b*, endpoint 506*c*, etc.) respectively, and forward the EDR data to NAC service manager 502. The NAC service manager 502, on receiving an incident report, or actively, may pull NAC data from the NAC agents (e.g., NAC 508*a*, NAC 410*a*, NAC 512*a*, etc.) installed on the endpoint devices (e.g., endpoint 506*a*, endpoint 506*b*, endpoint 506*c*, etc.). The NAC may receive incident reports from any of the endpoint security agents (UEBA 508*b*, UEBA 510*b*, UEBA 512*c*, SIEM 508*c*, SIEM 510*c*, SIEM 512*c*, etc.). The incident report may have contextual information that facilitates determination of an appropriate automated security action. The NAC service manager 502 performs the automated security operation based on data received from endpoint security agents. In an embodiment, NAC data and EDR data can be used in combination to perform device discovery and deep endpoint vulnerability assessment. In an embodiment, a combination of data collection from different endpoint security agents may help with compliance management.

Figure 6:
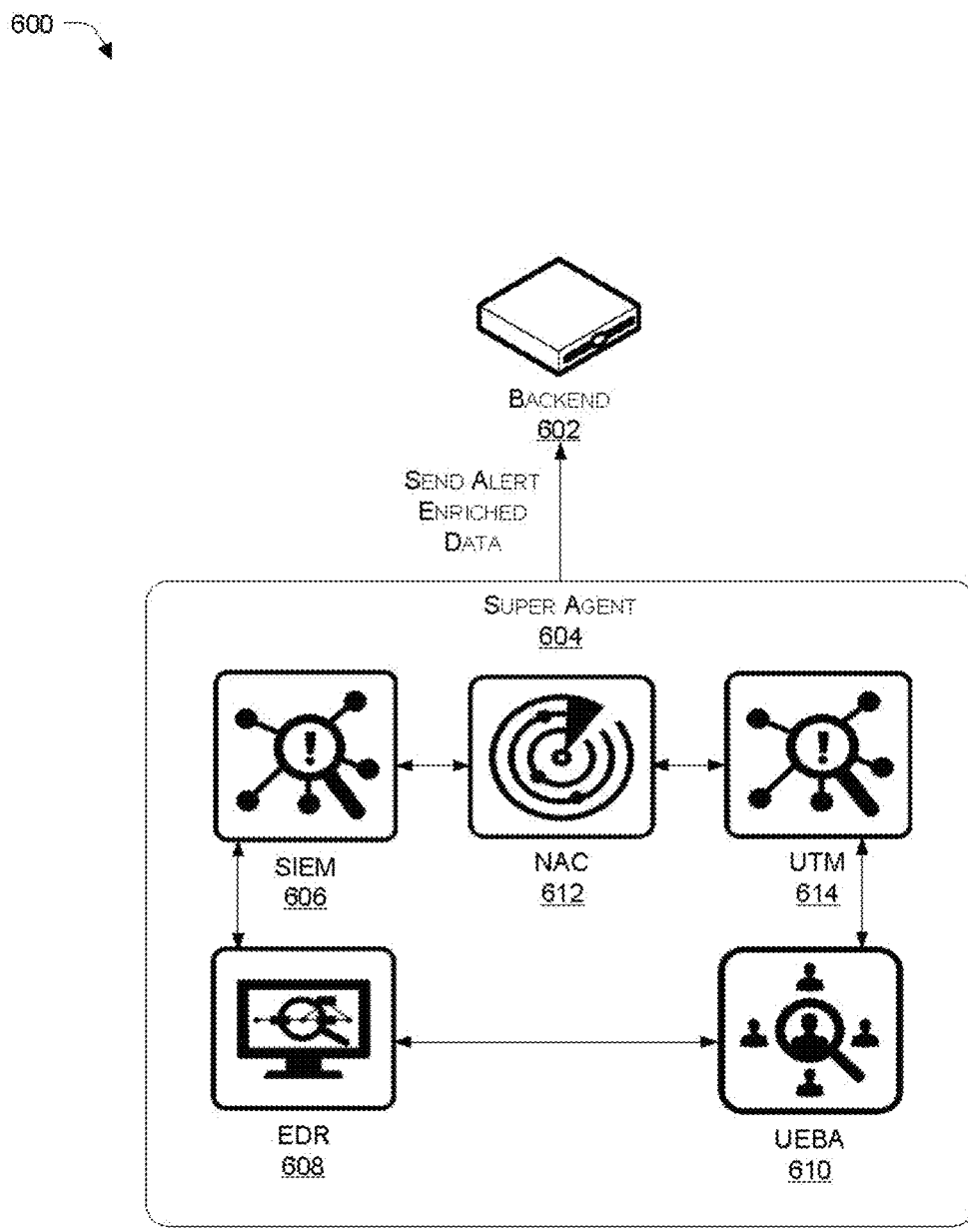
FIG. 6 is another use-case diagram illustrating interactions between SIEM, EDR, and UEBA agents that are configured as part of a super-agent in accordance with an embodiment of the present disclosure.

FIG. 6 is another use-case diagram 600 illustrating interactions between SIEM, EDR, and UEBA agents that are configured as part of a super-agent in accordance with an embodiment of the present disclosure. FIG. 6 is a use-case diagram 600 illustrating interactions between a SIEM agent 606, an EDR agent 608, a UEBA agent 610, and a NAC agent 612, of a super agent 604 (e.g., super agent 114) in accordance with an embodiment of the present disclosure. In a typical siloed deployment scenario, in which a STEM service (e.g., event management device 110 or event management service 128) is not in communication with other security services (e.g., an EDR service (e.g., EDR service 130) and/or a UEBA service (e.g., UEBA device 108 or UEBA service 126)), the SIEM service may receive alerts and/or generate alerts based on data collected from various different security controls. However, in the context of various examples described herein, when communication is facilitated between the SIEM service and other security services, for example, via the STEM agent 606, the EDR agent 608, the UEBA agent 610, and the NAC agent 612, the STEM service is able to provide additional supporting context relating to SIEM alerts by leveraging data collected by the EDR service, and/or UTM service, and/or the NAC service and/or the UEBA service. In an embodiment, the EDR 606 on detection of an incident may alert UEBA 610, SIEM 606, and NAC 612 to start aggressively collecting more data related to the incident detected by EDR 606.

In the context of the present example, alerts received by and/or generated by an EDR service based on data collected from various different security controls may be enhanced or enriched using data or network security information received from SIEM service via STEM agent 606), from an NAC service (e.g., NAC service 132) via the EDR agent 608, and/or a UEBA service (e.g., UEBA device 108 or UEBA service 128) via the UEBA agent 610.

In the context of the present example, assuming an incident (e.g., a modification to a sensitive file using a file integrity monitoring (FIN) mechanism) has been detected by the EDR service, the EDR service may leverage a UTM service (via their respective agents) or the NAC service (via the NAC agent) to obtain information regarding network interactions between the endpoint device where the incident is detected and other connected devices. In one embodiment, upon determination of the network intrusion, other compromised devices (e.g., a user device or IoT device) may also be determined. Additionally, suspicious activities associated with the network interaction may be determined and added to produce an enriched incident alert.

In various embodiments described herein, the super agent may produce the enriched incident alert using one or more of EDR data, UTM data and/or NAC data received from the EDR service (via EDR agent 608), UTM service (via the UTM agent 614), and/or NAC service (via NAC agent 612). The super agent 604 may send an alert with enhanced data to backend 602 service (example, the system 200) to efficiently perform asset discovery, initiate automated security operation, perform deep vulnerability assessment, and taking remedial actions.

Figure 7:
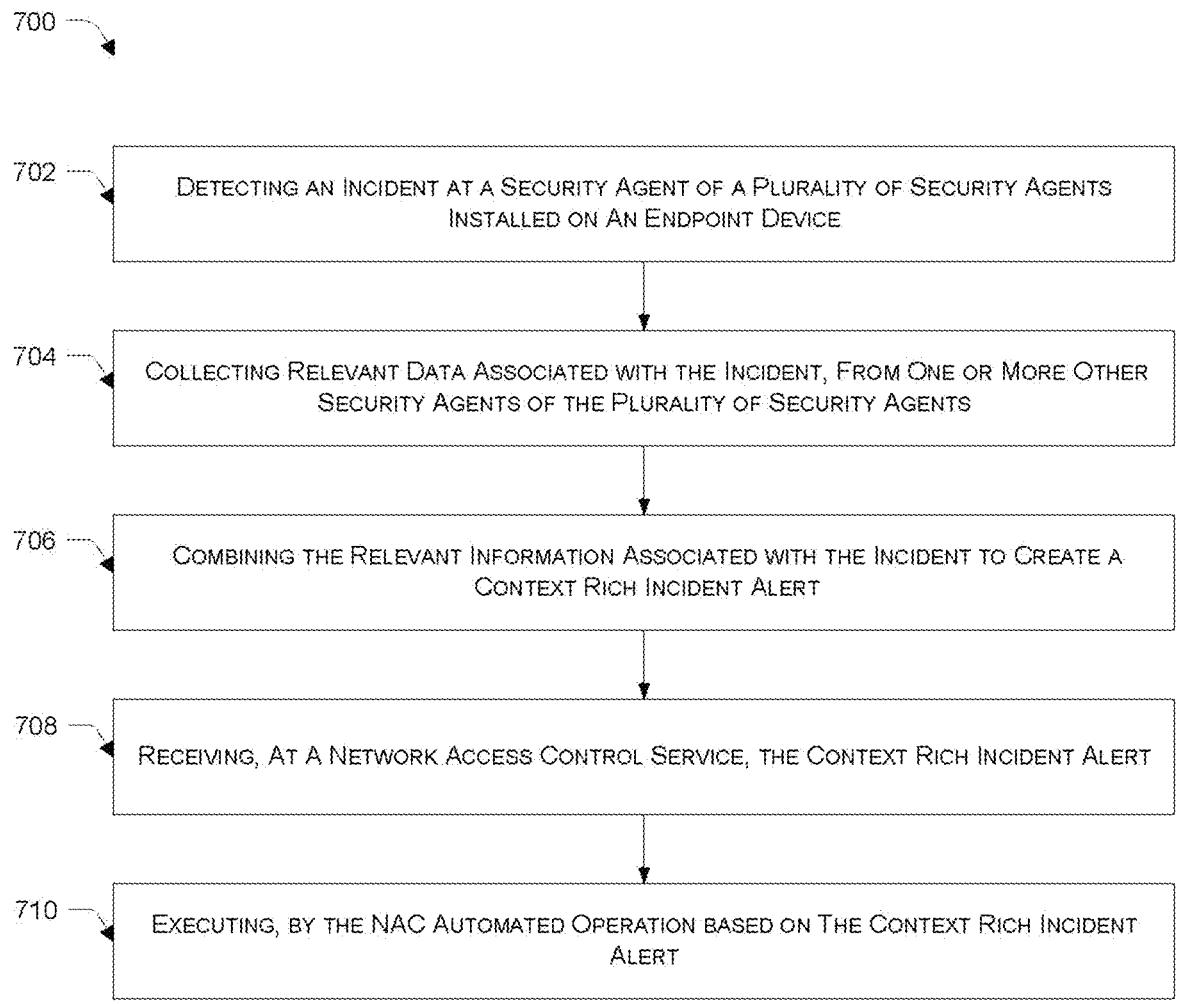
FIG. 7 is a flow diagram illustrating the process of context-rich incident reporting and automated response in accordance with an embodiment of the present disclosure.

FIG. 7 is a flow diagram illustrating the process 700 of context-rich incident reporting and automated response in accordance with an embodiment of the present disclosure. The process includes steps of detecting an incident at a security agent of a plurality of security agents installed on an endpoint device, as shown at block 702, collecting relevant data associated with the incident from one or more other security agents of the plurality of security agents, as shown at block 704, synergistically combining the relevant information associated with the incident to create a context-rich incident alert, as shown ay block 706, receiving at a network access control service, the context-rich incident alert as shown at block 708, and executing by the NAC service automated operation based on the context-rich incident alert. The method 700 may include steps of performing asset discovery based on EDR data and NAC data collected from the endpoint device, performing deep vulnerability assessment of the endpoint device and the connected devices, and taking remedial actions.

Figure 8:
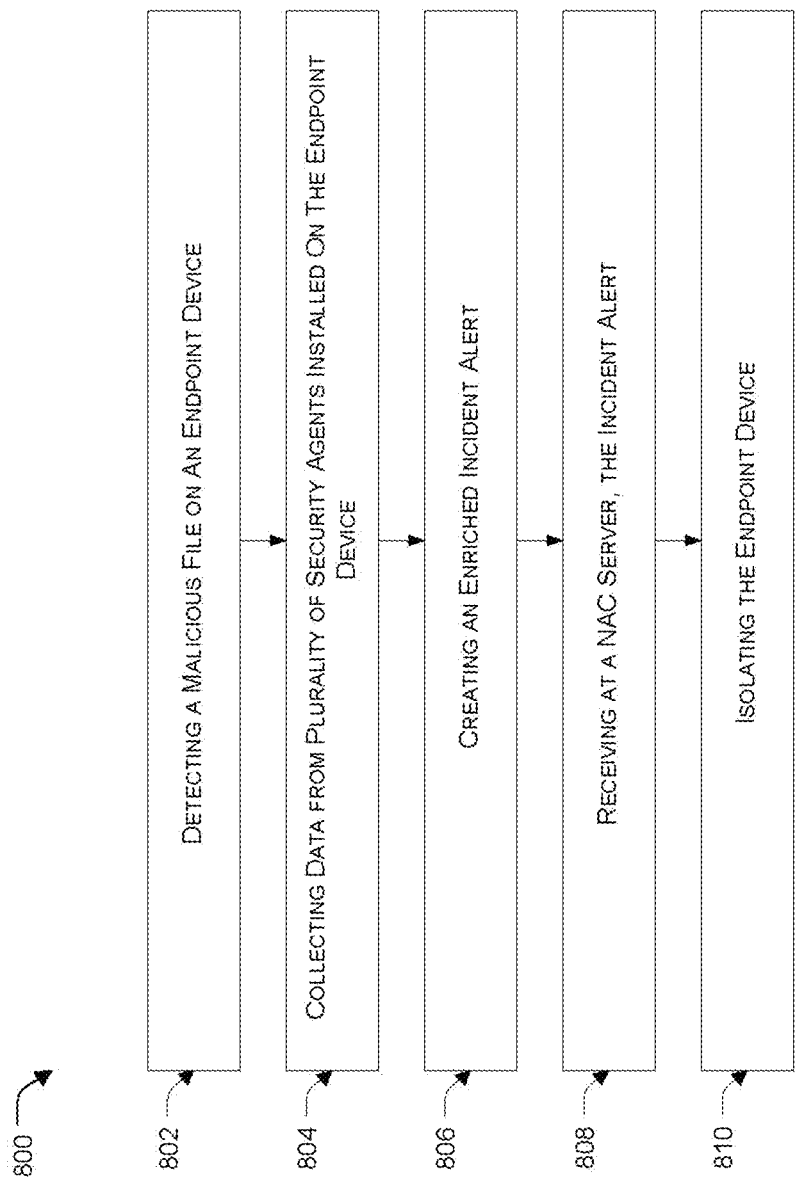
FIG. 8 is a flow diagram illustrating an example use case in accordance with an embodiment of the present disclosure.

FIG. 8 is a flow diagram illustrating an example use case in accordance with an embodiment of the present disclosure. FIG. 8 illustrates an example of automated action of isolating an endpoint device based on the incident alert. As shown in FIG. 8, process 800 includes steps of detecting a malicious file on an endpoint device, as shown at block 802, collecting data from a plurality of security agents installed on the endpoint device, as shown at block 804, creating an enhanced alert, as shown at block 806, receiving at a NAC service the incident alert as shown at block 808, and isolating the endpoint device as shown at block 810. The malicious file may be detected by any endpoint security agent, for example, by an EDR agent or a SIEM agent.

Figure 9:
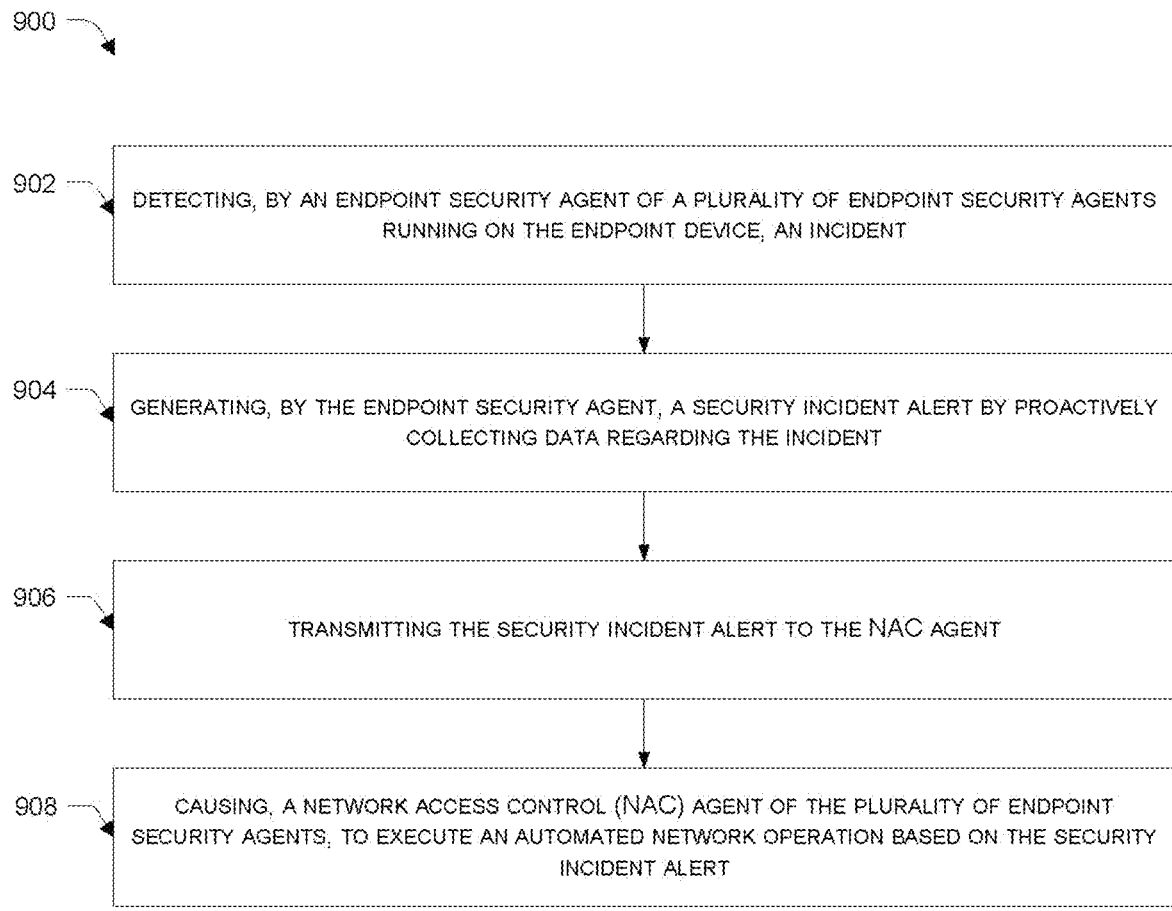
FIG. 9 is a flow diagram illustrating automated security operation processing in accordance with an embodiment of the present disclosure.

FIG. 9 is a flow diagram illustrating automated security operation processing in accordance with an embodiment of the present disclosure. The processing 900 includes steps of detecting by an endpoint security agent of a plurality of endpoint security agents running on the endpoint device an incident as shown at block 902, generating by the endpoint security agent a security incident alert by proactively collecting data regarding the incident as shown at block 904, transmitting the security incident alert to the NAC agent as shown at block 906, and causing a network access control (NAC) agent of the plurality of endpoint security agents to execute an automated network operation based on the security incident alert as shown at block 908.

Figure 10:
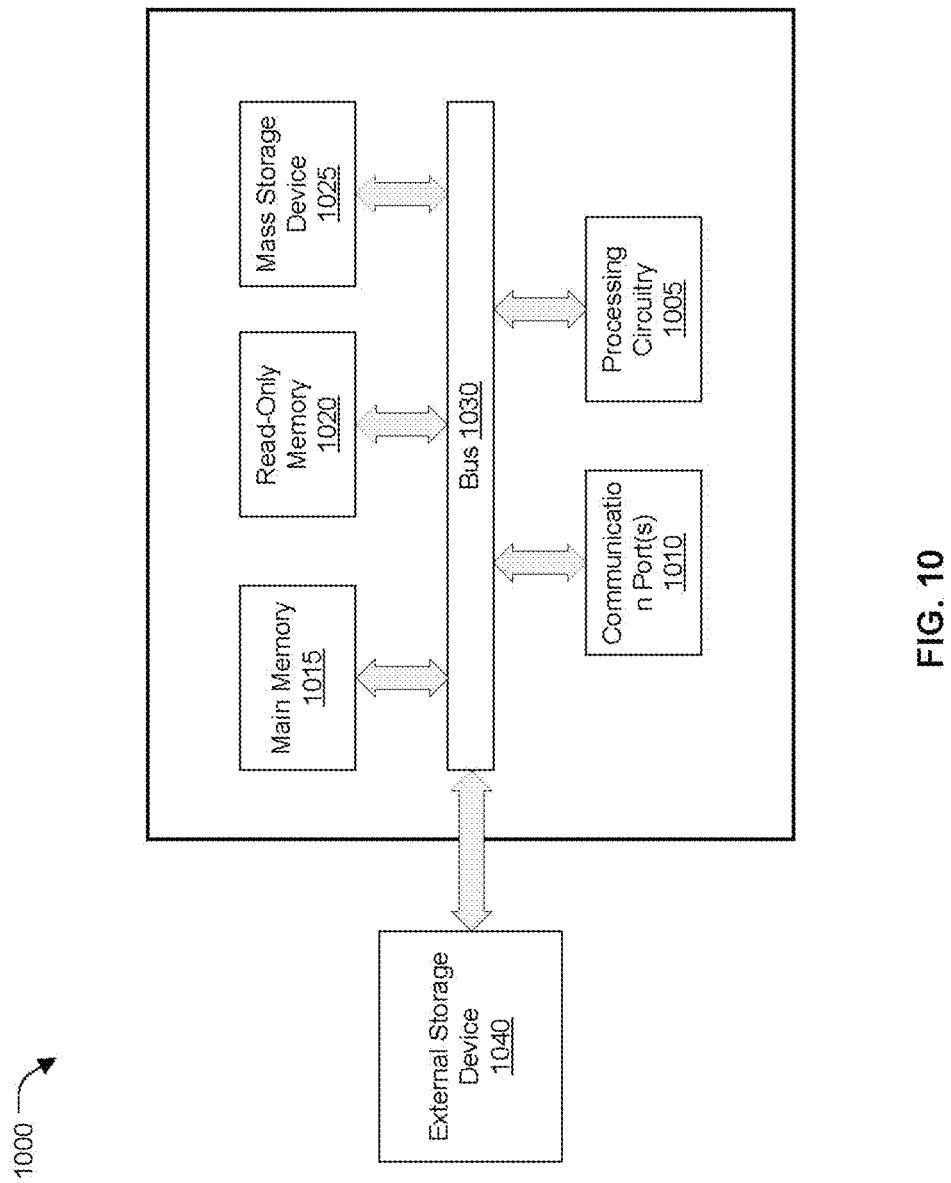
FIG. 10 illustrates an exemplary computer system in which or with which embodiments of the present disclosure may be utilized.

FIG. 10 illustrates an exemplary computer system 1000 in which or with which embodiments of the present disclosure may be utilized. As shown in FIG. 10, the computer system includes an external storage device 1040, a bus 1030, a main memory 1020, a read-only memory 1020, a mass storage device 1025, one or more communication ports 1010, and one or more processing resources (e.g., processing circuitry 1005). In one embodiment, computer system 1000 may represent some portion of an endpoint device (e.g., endpoint device 106 of FIGS. 1A-B) or a computing system in virtual or physical form supporting one of the security services described herein.

Those skilled in the art will appreciate that computer system 1000 may include more than one processing resource and communication port 1010. Non-limiting examples of processing circuitry 1005 include, but are not limited to, an Intel® Itanium® or Itanium 2 processor(s), or AMD® Opteron® or Athlon MP® processor(s), Motorola® lines of processors, FortiSOC™ system on chip processors or other future processors. Processing circuitry 1005 may include various modules associated with embodiments of the present disclosure.

Communication port 1010 can be any of an RS-232 port for use with a modem-based dialup connection, a 10/100 Ethernet port, a Gigabit or 10 Gigabit port using copper or fiber, a serial port, a parallel port, or other existing or future ports. Communication port 1010 may be chosen depending on a network, such as a Local Area Network (LAN), Wide Area Network (WAN), or any network to which the computer system connects.

Memory 1015 can be Random Access Memory (RAM), or any other dynamic storage device commonly known in the art. Read only memory 1020 can be any static storage device(s) e.g., but not limited to, a Programmable Read Only Memory (PROM) chips for storing static information e.g. start-up or BIOS instructions for the processing resource.

Mass storage 1025 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 1030 communicatively couples processing resource(s) with the other memory, storage and communication blocks. Bus 1030 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 1030 to support direct operator interaction with computer system. Other operator and administrative interfaces can be provided through network connections connected through communication port 1060. External storage device 604 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While embodiments of the present disclosure have been illustrated and described, numerous modifications, changes, variations, substitutions, and equivalents will be apparent to those skilled in the art. Thus, it will be appreciated by those of ordinary skill in the art that the diagrams, schematics, illustrations, and the like represent conceptual views or processes illustrating systems and methods embodying various non-limiting examples of embodiments of the present disclosure. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing the particular embodiment. Those of ordinary skill in the art further understand that the exemplary hardware, software, processes, methods, and/or operating systems described herein are for illustrative purposes and, thus, are not intended to be limited to any particular named.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

While the foregoing describes various embodiments of the disclosure, other and further embodiments may be devised without departing from the basic scope thereof.

What is claimed is:

1. An endpoint device comprising:
   a processing resource; and
   a non-transitory computer-readable medium, coupled to the processing resource, having stored therein instructions that when executed by the processing resource, cause the processing resource to:
   detect an incident on the endpoint device by a first endpoint security agent of a plurality of endpoint security agents running on the endpoint device, wherein the plurality of endpoint security agents further comprises at least a network access control (NAC) agent;
   collect relevant data associated with the incident from one or more other security agents of the plurality of endpoint security agents running on the endpoint device with the first endpoint security agent;
   generate a context-rich security incident alert by proactively collecting data regarding the incident from the one or more other security agents of the plurality of endpoint security agents by combining the collected relevant data automatically with the first endpoint security agent, wherein the context-rich security incident alert includes supporting context related to the incident provided by the endpoint device that the NAC agent does not have access to; and
   transmit the context-rich security incident alert with the NAC agent of the plurality of endpoint security agents corresponding to a NAC service of a Managed Security Service Provider (MSSP) external to the endpoint device and for protecting a private network with which the endpoint device is associated; and
   cause the NAC service of the MSSP to execute an automated network operation based on the context-rich security incident alert having alerts and/or supplemental data collected from other endpoint security agents.

2. The endpoint device of claim 1, wherein the NAC agent executes the automated network operation based on the security incident alert by requesting direction from the NAC service.

3. The endpoint device of claim 1, wherein the NAC agent executes the automated network operation based on the security incident alert by consulting NAC policies stored locally on the endpoint device.

4. The endpoint device of claim 1, wherein the endpoint security agent comprises an endpoint detection and response (EDR) agent associated with an EDR service of the MSSP.

5. The endpoint device of claim 4, wherein the incident relates to detection of a malicious file on the endpoint device by the EDR agent.

6. The endpoint device of claim 5, wherein the automated network operation comprises isolating the endpoint device from other assets associated with the private network.

7. The endpoint device of claim 1, wherein the endpoint security agent comprises an event management agent associated with an event management service of the MSSP.

8. The endpoint device of claim 7, wherein the event management agent comprises a security information and event management (SIEM) agent associated with a SIEM service of the MSSP.

9. The endpoint device of claim 1, wherein the event management agent comprises a UEBA agent associated with a UEBA service of the MSSP.

10. A method performed by a processing resource of an endpoint device, the method comprising:
   detecting an incident on the endpoint device by a first endpoint security agent of a plurality of endpoint security agents running on the endpoint device, wherein the plurality of endpoint security agents further comprises at least a network access control (NAC) agent;
   collecting relevant data associated with the incident from one or more other security agents of the plurality of endpoint security agents running on the endpoint device with the first endpoint security agent;
   generating a context-rich security incident alert by proactively collecting data regarding the incident from the one or more other security agents of the plurality of endpoint security agents by combining the collected relevant data automatically with the first endpoint security agent, wherein the context-rich security incident alert includes supporting context related to the incident provided by the endpoint device that the NAC agent does not have access to; and
   transmitting the context-rich security incident alert with the NAC agent of the plurality of endpoint security agents corresponding to a NAC service of a Managed Security Service Provider (MSSP) external to the endpoint device and for protecting a private network with which the endpoint device is associated; and
   causing the NAC service of the MSSP to execute an automated network operation based on the context-rich security incident alert having alerts and/or supplemental data collected from other endpoint security agents.

11. The method of claim 10, wherein the NAC agent executes the automated network operation based on the security incident alert by requesting direction from the NAC service.

12. The method of claim 10, wherein the NAC agent executes the automated network operation based on the security incident alert by consulting NAC policies stored locally on the endpoint device.

13. The method device of claim 10, wherein the endpoint security agent comprises an endpoint detection and response (EDR) agent associated with an EDR service of the MSSP.

14. The method of claim 13, wherein the incident relates to detection of a malicious file on the endpoint device by the EDR agent.

15. The method of claim 14, wherein the automated network operation comprises isolating the endpoint device from other assets associated with the private network.

16. The method of claim 10, wherein the endpoint security agent comprises an event management agent associated with an event management service of the MSSP, the event management agent comprises a security information and event management (SIEM) agent associated with a SIEM service of the MSSP, and the event management agent comprises a UEBA agent associated with a UEBA service of the MSSP.

17. A non-transitory computer-readable storage medium embodying a set of instructions, which when executed by a processing resource of an endpoint computing device, causes the processing resource to:
automatically detect an incident on the endpoint device by a first endpoint security agent of a plurality of endpoint security agents running on the endpoint device, wherein the plurality of endpoint security agents further comprises at least a network access control (NAC) agent,
automatically collect relevant data associated with the incident from one or more other security agents of the plurality of endpoint security agents running on the endpoint device with the first endpoint security agent;
automatically generate, by the endpoint security agent, a security incident alert by proactively collecting data regarding the incident from the one or more other security agents of the plurality of endpoint security agents by combining the collected relevant data automatically with the first endpoint security agent, wherein the context-rich security incident alert includes supporting context related to the incident provided by the endpoint device that the NAC agent does not have access to; and
automatically transmit the context-rich security incident alert with the NAC agent of the plurality of endpoint security agents corresponding to a NAC service of a Managed Security Service Provider (MSSP) external to the endpoint device and for protecting a private network with which the endpoint device is associated, to cause the NAC service of the MSSP to execute an automated network operation based on the security incident alert by transmitting the security incident alert to the NAC agent, the security incident alert having alerts and/or supplemental data collected from other endpoint security agents.

18. The non-transitory computer-readable storage medium of claim 17, wherein the NAC agent executes the automated network operation based on the security incident alert by requesting direction from the NAC service.

19. The non-transitory computer-readable storage medium of claim 17, wherein the NAC agent executes the automated network operation based on the security incident alert by consulting NAC policies stored locally on the endpoint device.

20. The non-transitory computer-readable storage medium of claim 17, wherein the endpoint security agent comprises an endpoint detection and response (EDR) agent associated with an EDR service of the MSSP.

21. The non-transitory computer-readable storage medium of claim 20, wherein the incident relates to detection of a malicious file on the endpoint device by the EDR agent.

22. The non-transitory computer-readable storage medium of claim 21, wherein the automated network operation comprises isolating the endpoint device from other assets associated with the private network.

23. The non-transitory computer-readable storage medium of claim 17, wherein the endpoint security agent comprises an event management agent associated with an event management service of the MSSP.

24. The non-transitory computer-readable storage medium of claim 23, wherein the event management agent comprises a security information and event management (SIEM) agent associated with a SIEM service of the MSSP.

* * * * *